United States Patent [19]
Levine et al.

[11] Patent Number: 5,970,439
[45] Date of Patent: Oct. 19, 1999

[54] PERFORMANCE MONITORING IN A DATA PROCESSING SYSTEM

[75] Inventors: Frank Eliot Levine; Charles Philip Roth; Edward Hugh Welbon, all of Austin, Tex.; Jack Chris Randolph, Rochester, Minn.

[73] Assignee: International Business Machines Corporation, Armonk, N.Y.

[21] Appl. No.: 08/816,626

[22] Filed: Mar. 13, 1997

[51] Int. Cl.⁶ .................................................. G06F 12/00
[52] U.S. Cl. ............................................. 702/186; 702/182
[58] Field of Search ........................... 702/117, 120, 702/182–186, 188, 189; 395/200.3, 200.78, 733

[56] References Cited

U.S. PATENT DOCUMENTS

| | | | |
|---|---|---|---|
| 4,009,348 | 2/1977 | Tate | 179/15 |
| 4,091,240 | 5/1978 | Lainey et al. | 179/15 |
| 4,905,171 | 2/1990 | Kiel et al. | 364/551.01 |
| 5,450,349 | 9/1995 | Brown, III et al. | 395/183.03 |
| 5,485,574 | 1/1996 | Bolosky et al. | 395/183.11 |
| 5,657,253 | 8/1997 | Dreyer et al. | 702/186 |
| 5,796,939 | 8/1998 | Berc et al. | 395/184.01 |
| 5,845,310 | 12/1998 | Brooks | 395/183.22 |

OTHER PUBLICATIONS

*IBM Technical Disclosure Bulletin*, "Small Computer System Interface Data Flow Control," vol. 38, No. 08, Aug., 1995.

*IBM Technical Disclosure Bulletin*, "Event Triggered Performance Monitoring," vol. 37, No. 9, Sep., 1994.

*Primary Examiner*—John Barlow
*Assistant Examiner*—Craig Steven Miller
*Attorney, Agent, or Firm*—Kelly K. Kordzik; Winstead Sechrest & Minick P.C.; Anthony V. S. England

[57] ABSTRACT

Performance monitoring capabilities are expanded to an entire data processing system so that performance analyses can be made for operations occurring within the entire data processing system and not merely within the processor or any other device containing the performance monitor. Therefore, there is a provision for communicating performance monitor-related signals between the various performance monitors within the various devices and processor within a data processing system.

19 Claims, 9 Drawing Sheets

FIG. 3

| BUFFER NUMBER | INSTRUCTION TYPE | | #GPR DEST. | #FPR DEST. | FINISHED | EXCEPTION |
|---|---|---|---|---|---|---|
| | | EXECUTION UNIT | | | | |
| 0 | | | | | | |
| 1 | | 22 | 1 | 0 | 0 | 0 |
| 2 | | 22 | 1 | 0 | 0 | 0 |
| 3 | | | | | | |
| 4 | | | | | | |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |
| 13 | | | | | | |
| 14 | | | | | | |
| 15 | | | | | | |

76

COMPLETION 75
ALLOCATION 73

FIG. 6A

| BITS 0-4 COUNTING ENABLES | BIT 5 INTERRUPT ENABLES | BITS 6-15 | BIT 16 PMC1 INTERRUPT CONTROL | BIT 17 PMCn, n>1 COUNT CONTROL | BIT 18 PMCn, n>1 COUNT CONTROL | BITS 19-25 PMC1 EVENT SELECTION | BITS 26-31 PMC2 EVENT SELECTION |

MMCR0

FIG. 6B

| BITS 0-4 PMC3 EVENT SELECTION | BITS 5-9 PMC4 EVENT SELECTION | BITS 10-14 PMC5 EVENT SELECTION | BITS 15-19 PMC6 EVENT SELECTION | BITS 20-24 PMC7 EVENT SELECTION | BITS 25-28 PMC8 EVENT SELECTION | BIT 29 FCUIABR | BIT 30 UPDATING MODE PMC1 | BIT 31 UPDATING MODE PMCn, n>1 |

MMCR1

PERFORMANCE MONITORING IN A DATA PROCESSING SYSTEM

CROSS-REFERENCE TO RELATED APPLICATIONS

The present application is related to the following applications:

Ser. No. 08/497,242, entitled "METHOD AND SYSTEM FOR HALTING PROCESSOR EXECUTION IN RESPONSE TO AN ENUMERATED OCCURRENCE OF A SELECTED COMBINATION OF INTERNAL STATES," filed Jun. 30,1995 now U.S. Pat. No. 5,875,294;

Ser. No. 08/485,953, entitled, "ON-CHIP PERFORMANCE MONITORING WITH A CHARACTERIZATION OF LOCKS/SEMAPHORE UTILIZATION," filed Jun. 7, 1995 now abandoned;

Ser. No. 08/537,586, entitled "A METHOD AND SYSTEM FOR PERFORMANCE MONITORING THROUGH IDENTIFICATION OF FREQUENCY AND LENGTH OF TIME OF EXECUTION OF SERIALIZATION INSTRUCTIONS IN A PROCESSING SYSTEM," filed Oct. 2, 1995 now pending;

Ser. No. 08/537,645, entitled "A METHOD AND SYSTEM FOR PERFORMANCE MONITORING THROUGH MONITORING AN ORDER OF PROCESSOR EVENTS DURING EXECUTION IN A PROCESSING SYSTEM," filed Oct. 2, 1995 now U.S. Pat. No. 5,752,062;

Ser. No. 08/538,071, entitled "A METHOD AND SYSTEM FOR SELECTING AND DISTINGUISHING AN EVENT SEQUENCE USING AN EFFECTIVE ADDRESS IN A PROCESSING SYSTEM," filed Oct. 2, 1995 now pending;

Ser. No. 08/539,023, entitled "A METHOD AND SYSTEM FOR PERFORMANCE MONITORING TIME LENGTHS OF DISABLED INTERRUPTS IN A PROCESSING SYSTEM," filed Oct. 2, 1995 now U.S. Pat. No. 5,797,019;

Ser. No. 08/538,102, entitled "A METHOD AND SYSTEM FOR PERFORMANCE MONITORING STALLS TO IDENTIFY PIPELINE BOTTLENECKS AND STALLS IN A PROCESSING SYSTEM," filed Oct. 2, 1995 now U.S. Pat. No. 5,751,945;

Ser. No. 08/538,509, entitled "A METHOD AND SYSTEM FOR PERFORMANCE MONITORING EFFICIENCY OF BRANCH UNIT OPERATION IN A PROCESSING SYSTEM," filed Oct. 2, 1995 now U.S. Pat. No. 5,729,726;

Ser. No. 08/536,492, entitled "A METHOD AND SYSTEM FOR PERFORMANCE MONITORING OF MISALIGNED MEMORY ACCESSES IN A PROCESSING SYSTEM," filed Oct. 2, 1995 now U.S. Pat. No. 5,748,855;

Ser. No. 08/538,774, entitled "A METHOD AND SYSTEM FOR PERFORMANCE MONITORING OF DISPATCH STALLS IN A PROCESSING SYSTEM," filed Oct. 2, 1995 now abandoned;

Ser. No. 08/538,070, entitled "A METHOD AND SYSTEM FOR PERFORMANCE MONITORING OF DISPATCH UNIT EFFICIENCY IN A PROCESSING SYSTEM," filed Oct. 2, 1995 now U.S. Pat. No. 5,691,920;

Ser. No. 08/734,335, entitled "PERFORMANCE MONITOR," filed Oct. 21, 1996 now U.S. Pat. No. 5,835,702;

Ser. No. 08/767,705, entitled "INSTRUCTION FETCH BANDWIDTH ANALYSIS," filed Dec. 17, 1996 now U.S. Pat. No. 5,881,306;

Ser. No. 08/766,143, entitled "CPI INFINITE AND FINITE ANALYSIS," filed Dec. 17, 1996 now pending;

Ser. No. 08/767,706, entitled "OPERAND FETCH BANDWIDTH ANALYSIS," filed Dec. 17, 1996 now pending;

Ser. No. 08/767,656, entitled "INSTRUCTION PARALLELISM ANALYSIS," filed Dec. 17, 1996 now pending;

Ser. No. 08/767,655, entitled "LOAD STALL ANALYSIS," filed Dec. 17, 1996 now pending; and Ser. No. 08/767,662, entitled "TRAILING EDGE ANALYSIS," filed Dec. 17, 1996 now U.S. Pat. No. 5,802,273.

Each of the above applications is assigned to the assignee of the present application and is hereby incorporated by reference herein.

TECHNICAL FIELD

The present invention relates in general to data processing systems, and in particular, to performance monitoring in data processing systems.

BACKGROUND INFORMATION

In typical computer systems utilizing processors, system developers desire optimization of execution software for more effective system design. Usually, studies of a program's access patterns to memory and interaction with a system's memory hierarchy are performed to determine system efficiency. Understanding the memory hierarchy behavior aids in developing algorithms that schedule and/or partition tasks, as well as distribute and structure data for optimizing the system.

Performance monitoring is often used in optimizing the use of software in a system. A performance monitor is generally regarded as a facility incorporated into a processor to monitor selected characteristics to assist in the debugging and analyzing of systems by determining a machine's state at a particular point in time. Often, the performance monitor produces information relating to the utilization of a processor's instruction execution and storage control. For example, the performance monitor can be utilized to provide information regarding the amount of time that has passed between events in a processing system. The information produced usually guides system architects toward ways of enhancing performance of a given system or of developing improvements in the design of a new system.

Prior art approaches to performance monitoring include the use of external test instruments. Unfortunately, this approach is not completely satisfactory. Test instruments can be attached to the external processor interface, but these cannot determine the nature of internal operations of a processor. Test instruments attached to the external processor interface cannot distinguish between instructions executing in the processor. Test instruments designed to probe the internal components of a processor are typically considered prohibitively expensive because of the difficulty associated with monitoring the many busses and probe points of complex processor systems that employ pipelines, instruction prefetching, data buffering, and more than one level of memory hierarchy within the processors. A common approach for providing performance data is to change or instrument the software. This approach however, significantly affects the path of execution and may invalidate any results collected. Consequently, software-accessible counters are incorporated into processors. Most software-accessible counters, however, are limited in the amount of granularity of information they provide.

Further, a conventional performance monitor is usually unable to capture machine state data until an interrupt is signaled, so that results may be biased toward certain machine conditions that are present when the processor allows interrupts to be serviced. Also, interrupt handlers may cancel some instruction execution in a processing system where, typically, several instructions are in progress at one time. Further, many interdependencies exist in a processing system, so that in order to obtain any meaningful data and profile, the state of the processing system must be obtained at the same time across all system elements. Accordingly, control of the sample rate is important because this control allows the processing system to capture the appropriate state. It is also important that the effect that the previous sample has on the sample being monitored is negligible to ensure the performance monitor does not affect the performance of the processor. Accordingly, there exists a need for a system and method for effectively monitoring processing system performance that will efficiently and noninvasively identify potential areas for improvement. A more effective performance monitoring system has been disclosed in the cross-referenced applications noted above.

Instrumentation of processors is now becoming popular. But providing information known to the processor does not provide for a full system analysis. In order to analyze the performance of the entire system (and not just the processor), it is important to provide information related to system components. The typical approach to providing information between system components and the processor is via signals, which translate into pins. The more pins, the more the processor cost. For this reason, it is usually prohibitive to require that the individual components provide count information to the processor, which can in turn, provide information to the application(s) running the processor.

Providing a cost effective means to control and capture the information related to the system components will allow for a better analysis of system performance for a wider variety of systems, including those built at a lower cost.

SUMMARY OF THE INVENTION

The present invention addresses the foregoing need by providing a data processing system comprising a processor and peripheral devices coupled to the processor, wherein one or more of the devices has a performance monitoring capability. Furthermore, there is provided a capability of the performance monitors within the various data processing system devices to communicate with each other, and specifically to the performance monitor residing on the processor (or within a programmable circuit). As a result, an analysis of system performance can be expanded beyond the boundaries of the processor to the entire data processing system. As a result, a designer of a data processing system can create various analyses to be implemented with the various performance monitors within the devices in order to analyze various operational aspects of the data processing system.

In one alternative embodiment of the present invention, signals sent between the processor and the various peripheral devices can be masked.

In another alternative embodiment of the present invention, a common architecture is used for programming the various performance monitors within the system.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which:

FIG. 3 is a conceptual illustration of a reorder buffer of the sequencer unit of FIG. 2;

FIGS. 6A and 6B illustrate monitor control registers (MMCRn) utilized to manage a plurality of counters;

DETAILED DESCRIPTION

Figure 1:
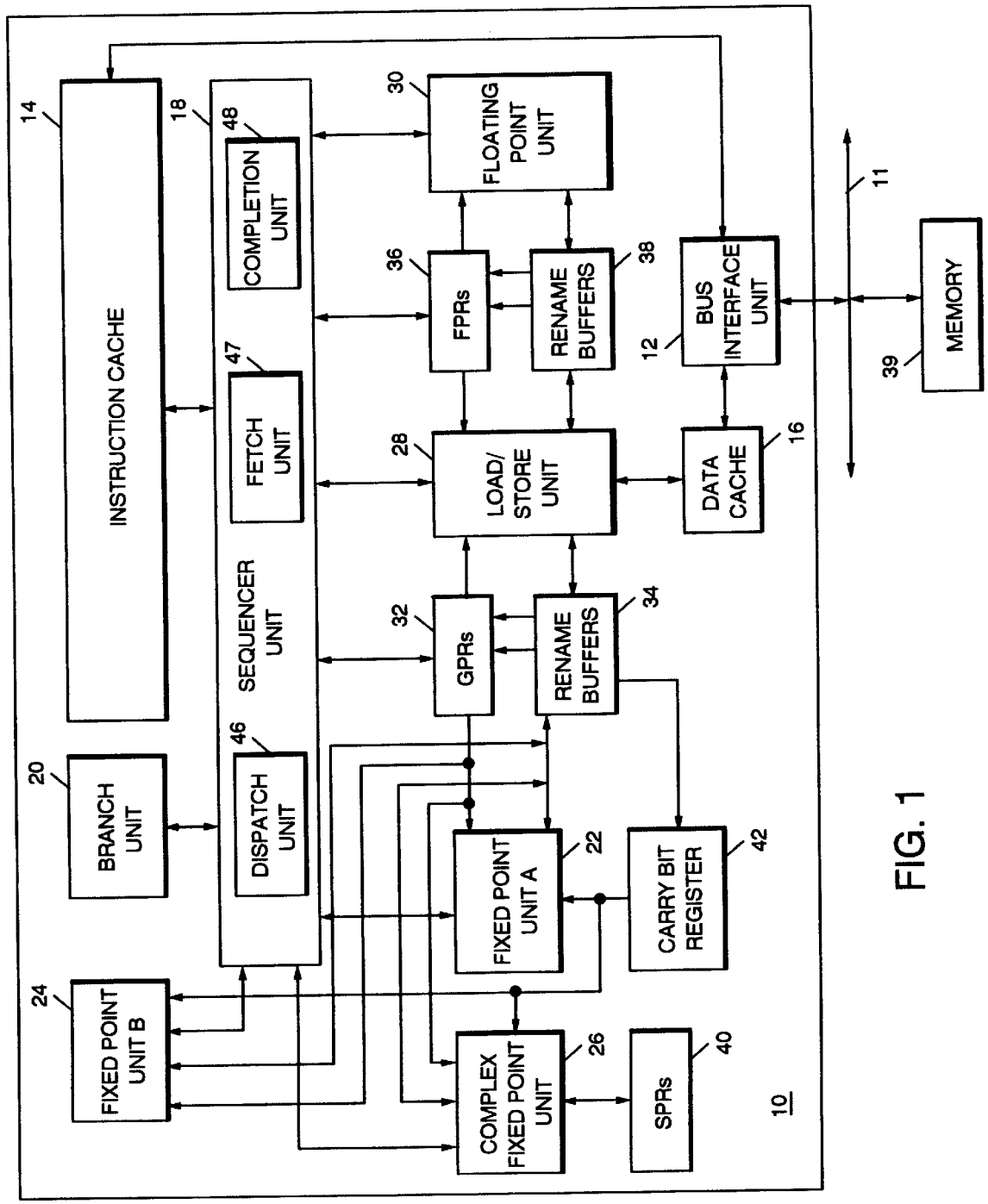
FIG. 1 is a block diagram of a processor for processing information in accordance with the present invention.

In the following description, numerous specific details are set forth such as specific word or byte lengths, etc., to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 is a block diagram of a processor 10 system for processing information according to one embodiment. Processor 10 is a single integrated circuit superscalar microprocessor, such as the PowerPC™ processor from IBM Corporation, Austin, Tex. Accordingly, as discussed further hereinbelow, processor 10 includes various units, registers, buffers, memories, and other sections, all of which are formed by integrated circuitry. Processor 10 operates according to reduced instruction set computing ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18 which includes execution units of a dispatch unit 46, a fetch unit 47, and a completion unit 48, the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42.

FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches through a dispatch unit 46 the instructions to selected ones of execution units 20, 22 24, 26, 28 and 30. Each execution unit executes one or more instructions of a particular class of instructions. For example, FXUA 22 and FXUB 24 execute a first class of fixed point mathematical operations on source operands, such as addition, subtraction. ANDing, ORing and XORing. CFXU 26 executes a second class of fixed point operations on source operands, such as fixed point multiplication and division. FPU 30 executes floating point operations on source operands, such as floating point multiplication and division.

As information is stored at a selected one of rename buffers 34, such information is associated with a storage location (e.g., one of GPRs 32 or CA register 42) as specified by the instruction for which the selected rename buffer is allocated. Information stored at a selected one of rename buffers 34 is copied to its associated one of GPRs 32 (or CA register 42) in response to signals from sequencer unit 18. Sequencer unit 18 directs such copying of information stored at a selected one of rename buffers 34 in response to "completing" the instruction that generated the information through a completion unit 48. Such copying is called "writeback".

As information is stored at a selected one of rename buffers 38, such information is associated with one of FPRs 36. Information stored at a selected one of rename buffers 38 is copied to its associated one of FPRs 36 in response to signals from sequencer unit 18. Sequencer unit 18 directs such copying of information stored at a selected one of rename buffers 38 in response to "completing" the instruction that generated the information.

Processor 10 achieves high performance by processing multiple instructions simultaneously at various ones of execution units 20, 22, 24, 26, 28 and 30. Accordingly, each instruction is processed as a sequence of stages, each being executable in parallel with stages of other instructions. Such a technique is called "superscalar pipelining". An instruction is normally processed as six stages, namely fetch, decode, dispatch, execute, completion, and writeback.

In the fetch stage, sequencer unit 18 (fetch unit 47) selectively inputs (from instructions cache 14) one or more instructions from one or more memory addresses storing the sequence of instructions discussed further hereinabove in connection with branch unit 20 and sequencer unit 18.

In the decode stage, sequencer unit 18 decodes up to four fetched instructions.

In the dispatch stage, sequencer unit 18 selectively dispatches up to four decoded instructions to selected (in response to the decoding in the decode stage) ones of execution units 20, 22, 24, 26, 28 and 30 after reserving a rename buffer entry for each dispatched instruction's result (destination operand information) through a dispatch unit 46. In the dispatch stage, operand information is supplied to the selected execution units for dispatched instructions. Processor 10 dispatches instructions in order of their programmed sequence.

In the execute stage, execution units execute their dispatched instructions and output results (destination operand information) of their operations for storage at selected entries in rename buffers 34 and rename buffers 38 as discussed further hereinabove. In this manner, processor 10 is able to execute instructions out of order relative to their programmed sequence.

In the completion stage, sequencer unit 18 indicates an instruction is "complete". Processor 10 "completes" instructions in order of their programmed sequence.

In the writeback stage, sequencer 18 directs the copying of information from rename buffers 34 and 38 to GPRs 32 and FPRs 36, respectively. Sequencer unit 18 directs such copying of information stored at a selected rename buffer. Likewise, in the writeback stage of a particular instruction, processor 10 updates its architectural states in response to the particular instruction. Processor 10 processes the respective "writeback" stages of instructions in order of their programmed sequence. Processor 10 advantageously merges an instruction's completion stage and writeback stage in specified situations.

Although it would be desirable for each instruction to take one machine cycle to complete each of the stages of instruction processing, in most implementations, there are some instructions (e.g., complex fixed point instructions executed by CFXU 26) that require more than one cycle. Accordingly, a variable delay may occur between a particular instruction's execution and completion stages in response to the variation in time required for completion of preceding instructions.

Figure 2:
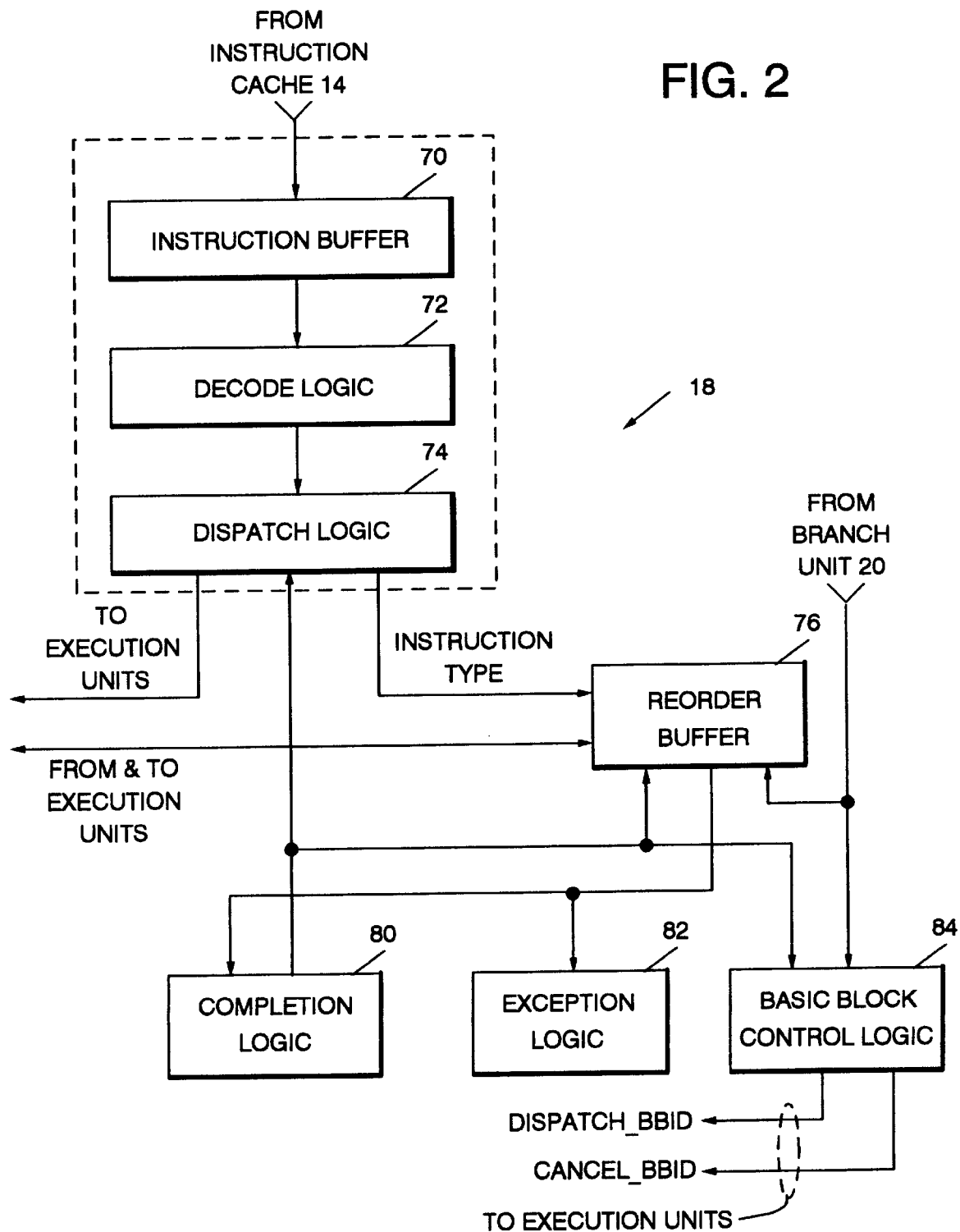
FIG. 2 is a block diagram of a sequencer unit of the processor of FIG. 1.

FIG. 2 is a block diagram of sequencer unit 18. As discussed further hereinabove, in the fetch stage, sequencer unit 18 selectively inputs up to four instructions from instructions cache 14 and stores such instructions in an instruction buffer 70. In the decode stage, decode logic 72 inputs and decodes up to four fetched instructions from instruction buffer 70. In the dispatch stage, dispatch logic 74 selectively dispatches up to four decoded instructions to selected (in response to the decoding in the decode stage) ones of execution units 20, 22, 24, 26, 28 and 30.

FIG. 3 is a conceptual illustration of a reorder buffer 76 of sequencer unit 18. As shown in FIG. 3, reorder buffer 76 has sixteen entries respectively labelled as buffer numbers 0–15. Each entry has five primary fields, namely an "instruction type" field, a "number-of-GPR destinations" field, a "number-of-FPR destinations" field, a "finished" field, and an "exception" field.

Referring also to FIG. 2, as dispatch logic 74 dispatches an instruction to an execution unit, sequencer unit 18 assigns the dispatched instruction to an associated entry in reorder buffer 76. Sequencer unit 18 assigns (or "associates") entries in reorder buffer 76 to dispatched instructions on a first-in first-out basis and in a rotating manner, such that sequencer unit 18 assigns entry 0, followed sequentially by entries 1–15, and then entry 0 again. As the dispatched instruction is assigned an associated entry in reorder buffer 76, dispatch logic 74 outputs information concerning the dispatched instruction for storage in the various fields and subfields of the associated entry in reorder buffer 76.

For example, in entry 1 of FIG. 3, reorder buffer 76 indicates the instruction is dispatched to FXUA 22. Entry 1 further indicates the dispatched instruction has one GPR destination register (such that "number-of-GPR destinations"=1), has zero FPR destination registers (such that "number-of-FPR destinations"=0), is not yet finished (such that "finished"=0), and has not yet caused an exception (such that "exception"=0).

As an execution unit executes a dispatched instruction, the execution unit modifies the instruction's associated entry in reorder buffer 76. More particularly, in response to finishing execution of the dispatched instruction, the execution unit modifies the entry's "finished" field (such that "finished"=1). If the execution unit encounters an exception during execution of the dispatched instruction, the execution unit modifies the entry's "exception" field (such that "exception"=1).

FIG. 3 shows an allocation pointer 73 and a completion pointer 75. Processor 10 maintains such pointers for controlling reading from and writing to reorder buffer 76.

Processor 10 maintains allocation pointer 73 to indicate whether a reorder buffer entry is allocated to (or "associated with") a particular instruction. As shown in FIG. 3, allocation pointer 73 points to reorder buffer entry 3, thereby indicating that reorder buffer entry 3 is the next reorder buffer entry available for allocation to an instruction.

Also, processor 10 maintains completion pointer 75 to indicate (for a reorder buffer entry previously allocated to a particular instruction) whether the particular instruction satisfies the following conditions:

Condition 1—The execution unit (to which the instruction is dispatched) finishes execution of the instruction;

Condition 2—No exceptions were encountered in connection with any stage of processing the instruction; and Condition 3—Any previously dispatched instruction satisfies Condition 1 and Condition 2.

As shown in FIG. 3, completion pointer 75 points to reorder buffer entry 1, thereby indicating that reorder buffer entry 1 is the next reorder buffer entry capable of satisfying Conditions 1, 2 and 3. Accordingly, "valid" reorder buffer entries can be defined as the reorder buffer entry pointed to by completion buffer 75 and its subsequent reorder buffer entries that precede the reorder buffer entry pointed to by allocation pointer 73.

Referring again to FIG. 2, the entries of reorder buffer 76 are read by completion logic 80 and exception logic 80 of sequencer unit 18. In response to the "exception" fields of reorder buffer 76, exception logic 82 handles exceptions encountered during execution of dispatched instructions. In response to the "finished" fields and "exception" fields of reorder buffer 76, completion logic 80 indicates "completion" of instructions in order of their programmed sequence. Completion logic 80 indicates "completion" of an instruction if it satisfies the following conditions.

Condition 1—The execution unit (to which the instruction is dispatched) finishes execution of the instruction (such that "finished"=1 in the instruction's associated entry in reorder buffer 76);

Condition 2—No exceptions were encountered in connection with any stage of processing the instruction (such that "exception"=0 in the instruction's associated entry in reorder buffer 76); and Condition 3—Any previously dispatched instruction satisfies Condition 1 and Condition 2.

In response to information in reorder buffer 76, dispatch logic 74 determines a suitable number of additional instructions to be dispatched.

Figure 4:
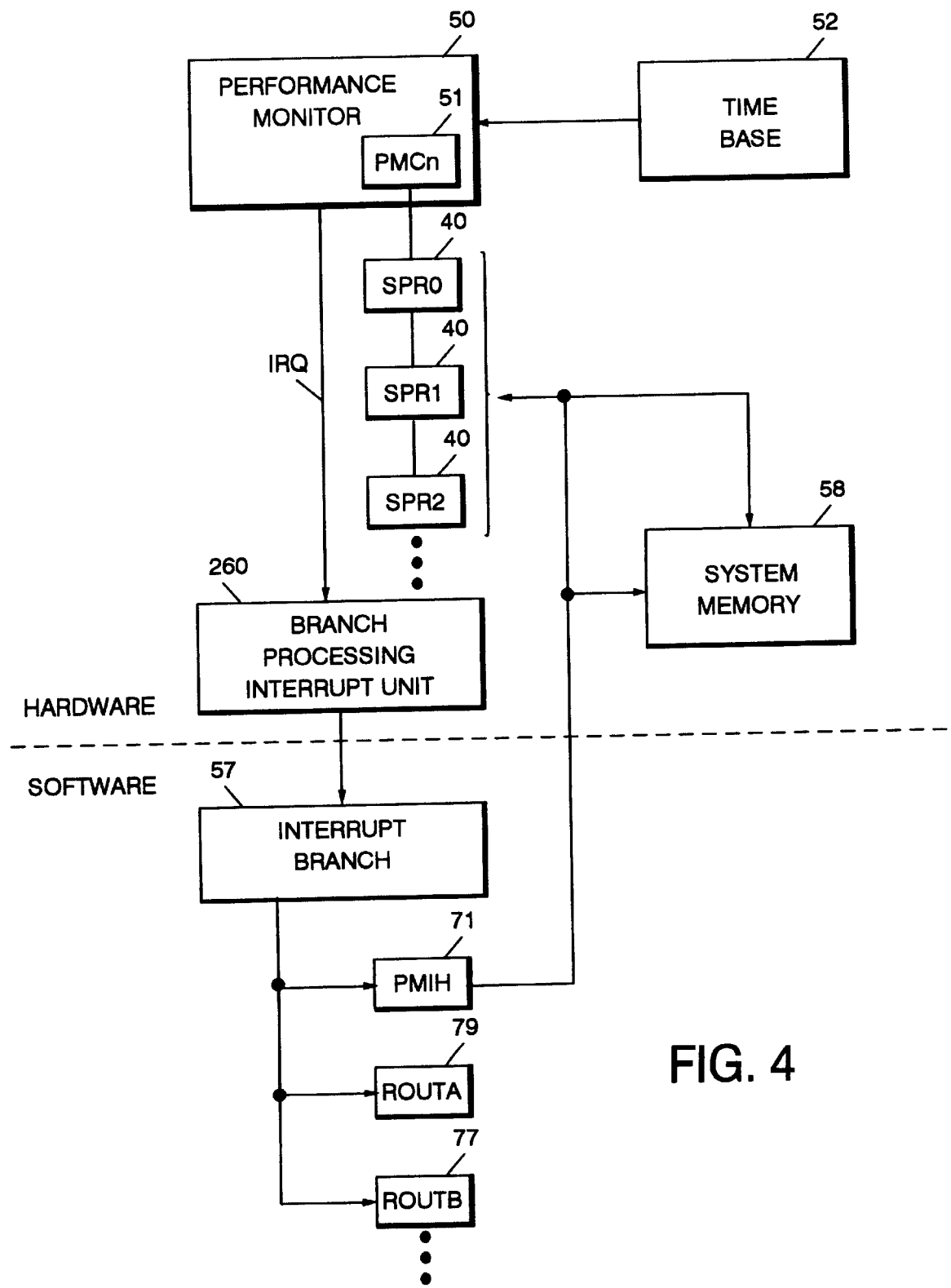
FIG. 4 is a block diagram of a performance monitoring aspect of the present invention.
Figure 7:
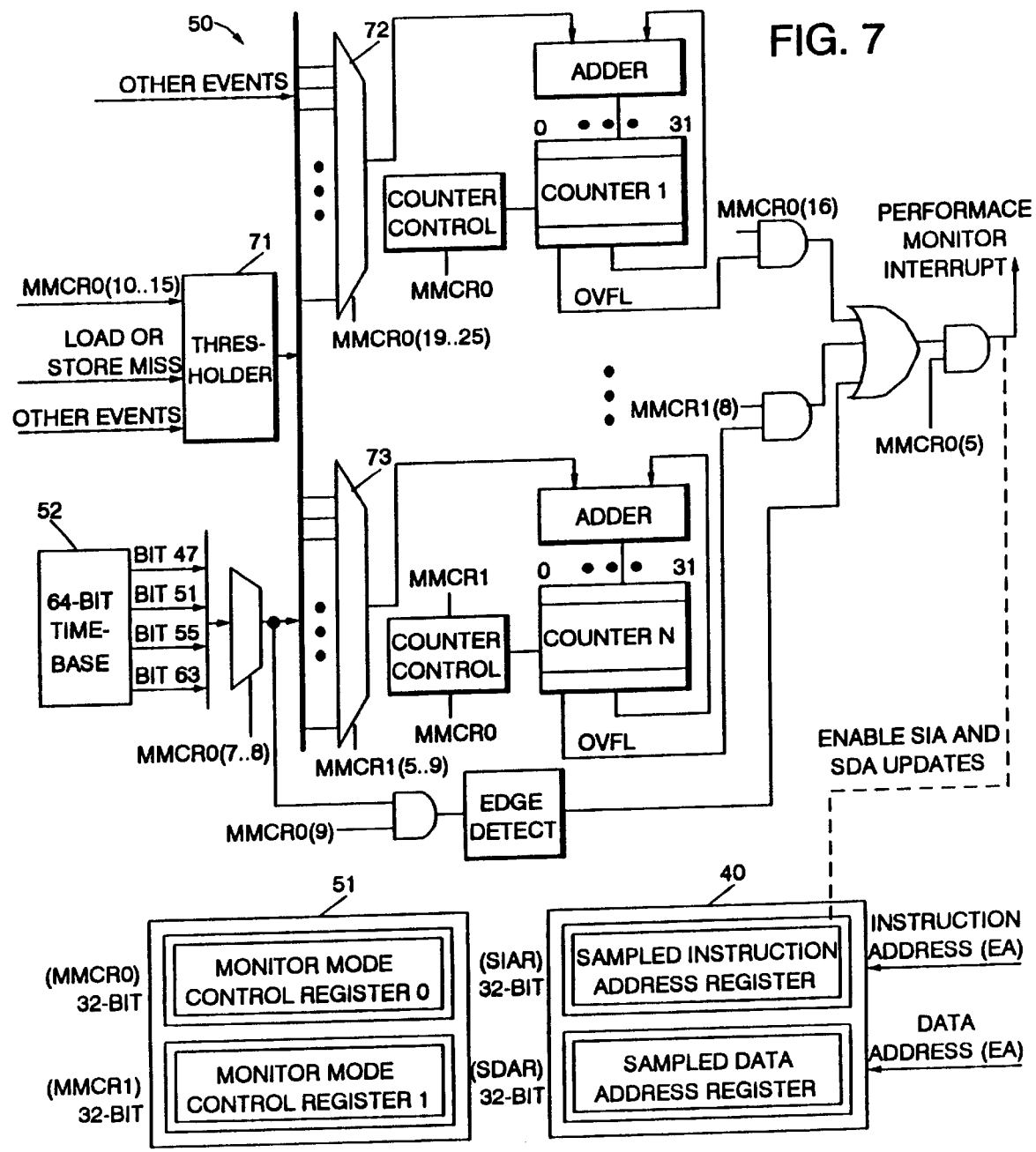
FIG. 7 illustrates a block diagram of a performance monitor configured in accordance with the present invention.

Referring to FIGS. 4 and 7, a feature of processor 10 is performance monitor (PM) 50. Performance monitor 50 is a software-accessible mechanism intended to provide detailed information with significant granularity concerning the utilization of PowerPC instruction execution and storage control. Generally, the performance monitor 50 includes an implementation-dependent number (e.g., 1–8) of counters 51, e.g, PMC1–PMC8, used to count processor/storage related events. Further included in performance monitor 50 are monitor mode control registers (MMCRn) that establish the function of the counters PMCn, with each MMCR usually controlling some number of counters. Registers MMCRn are typically special purpose registers physically residing on the processor 10, e.g., a PowerPC. These special purpose registers are accessible for read or write via mfspr (move from special purpose register) and mtspr (move to special purpose register) instructions, where the writing operation is allowed in a privileged or supervisor state, while reading is allowed in a problem state since reading the special purpose registers does not change the register's content. In a different embodiment, these registers may be accessible by other means such as addresses in I/O space.

The MMCRn registers are partitioned into bit fields that allow for event/signal selection to be recorded/counted. Selection of an allowable combination of events causes the counters to operate concurrently.

The MMCRn registers include controls, such as counter enable control, counter negative interrupt controls, counter event selection, and counter freeze controls, with an implementation-dependent number of events that are selectable for counting. Smaller or larger counters and registers may be utilized to correspond to a particular processor and bus architecture or an intended application, so that a different number of special purpose registers for MMCRn and PMCn may be utilized without departing from the spirit and scope of the present invention.

The performance monitor 50 is provided in conjunction with a time base facility 52 which includes a counter that designates a precise point in time for saving the machine state. The time base facility 52 includes a clock with a frequency that is typically based upon the system bus clock and is a required feature of a superscalar processor system including multiple processors 10 to provide a synchronized time base. The time base clock frequency is provided at the frequency of the system bus clock or some fraction, e.g., ¼ of the system bus clock.

Predetermined bits within a 64-bit counter included in the time base facility 52 are selected for monitoring such that the increment of time between monitored bit flips can be controlled. Synchronization of the time base facility 52 allows all processors in a multiprocessor system to initiate operation in synchronization. Examples of methods for performing such synchronization are provided in U.S. Pat. No. 5,802,378, entitled "Performance Monitoring in a Multiprocessor System With Interrupt Masking", assigned to an assignee of the present invention and incorporated herein by reference in its entirety.

Time base facility 52 further provides a method of tracking events occurring simultaneously on each processor of a multiprocessor system. Since the time base facility 52 provides a simple method for synchronizing the processors, all of the processors of a multiprocessor system detect and react to a selected single system-wide event in a synchronous manner. The transition of any bit or a selected one of a group of bits may be used for counting a condition among multiple processors simultaneously such that an interrupt is signalled when a bit flips or when a counted number of events has occurred.

In operation, a notification signal is sent to PM 50 from time base facility 52 when a predetermined bit is flipped. The PM 50 then saves the machine state values in special purpose registers. In a different scenario, the PM 50 uses a "performance monitor" interrupt signalled by a negative counter (bit zero on) condition. The act of presenting the state information including operand and address data may be delayed if one of the processors has disabled interrupt handling.

In order to ensure that there is no loss of data due to interrupt masking, when the interrupt condition is signaled, the processors capture the effective instruction and operand (if any) addresses of "an" instruction in execution and present an interrupt to the interrupt resolution logic 57, which employs various interrupt handling routines 71, 77, 79. These addresses are saved in registers, Saved Data Address (SDAR) and Saved Instruction Address (SIAR), which are designated for these purposes at the time of the system-wide signaling. The state of various execution units are also saved. This state of various execution units at the time the interrupt is signalled is provided in a saved state register (SSR). This SSR could be an internal register or a software accessible SPR. Thus, when the interrupt is actually serviced, the content of these registers provide the information concerning current instructions that are currently executing in the processor at the time of the signaling.

When the PM 50 receives the notification from time base 52 to indicate that it should record "sample data", an interrupt signal is output to a branch processing unit 20. Concurrently, the sample data (machine state data) is placed in SPRs 40 including the SIAR, SDAR and SSR which are suitably provided as registers or addresses in I/O space. A flag may be used to indicate interrupt signalling according to a chosen bit transition as defined in the MMCRn. Of course, the actual implementation of the time base facility 52 and the selected bits is a function of the system and processor implementation.

Figure 5:
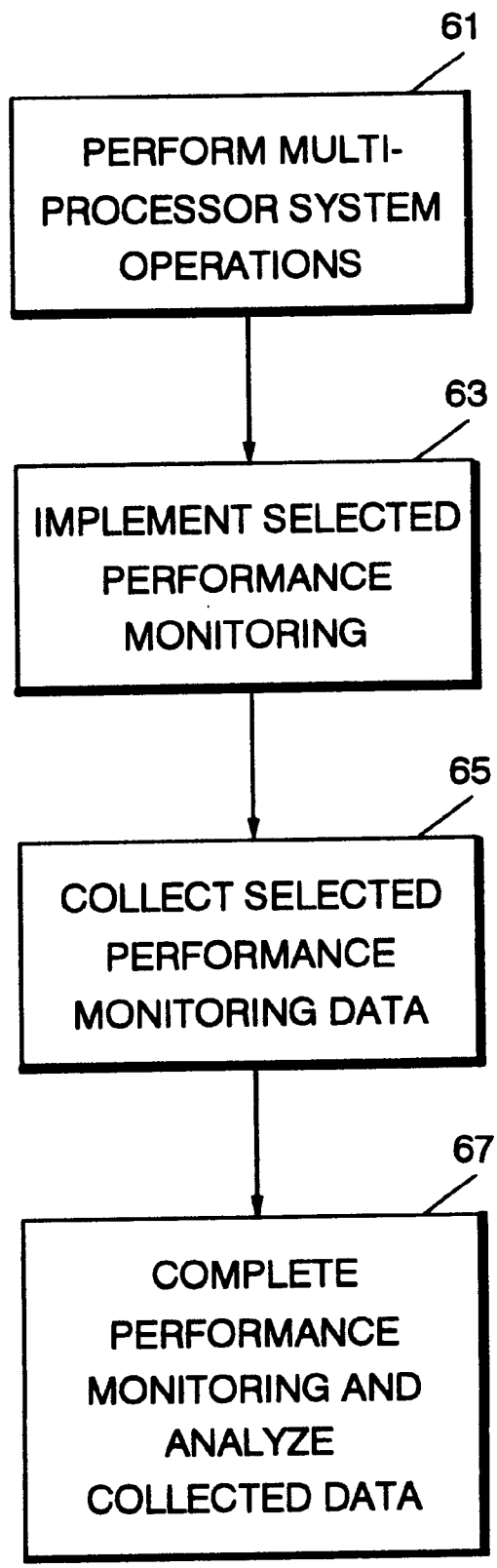
FIG. 5 is a block diagram of an overall process flow in accordance with the present invention of processing system operation including performance monitoring.

A block diagram, as shown in FIG. 5, illustrates an overall process flow in accordance with the present invention of superscalar processor system operation including performance monitoring. The process begins in block 61 with the processing of instructions within the superscalar processor system. During the superscalar processor system operation, performance monitoring is implemented in a selected manner via block 63 through configuration of the performance monitor counters by the monitor mode control registers and performance monitoring data is collected via block 65.

By adjusting the values of the performance monitor counts, that is by setting the values of the counters high enough so that an exception is signalled by some predetermined number of occurrences of an event, a profile of system performance can be obtained. Further, for purposes of this disclosure, a performance monitoring interrupt preferably occurs at a selectable point in the processing. As described in more detail below, a predetermined number of events is suitably used to select the stop point. For example, counting can be programmed to end after two instructions by causing the counter to go negative after the completion of two instructions. Further, for purposes of this disclosure, the time period during which monitoring occurs is known. Thus, the data collected has a context in terms of the number of minutes, hours, days, etc. over which the monitoring is performed.

As described herein below, selected performance monitoring includes reconstructing a relationship among events, identifying false triggering, identifying bottlenecks, monitoring stalls, monitoring idles, determining the efficiency of operation of a dispatch unit, determining the effectiveness of branch unit operations, determining a performance penalty of misaligned data accesses, identifying a frequency of execution of serialization instructions, identifying inhibited interrupts, and applying Little's Law to identify efficiency.

The selected performance monitoring routine is completed and the collected data is analyzed via block 67 to identify potential areas of system enhancements. A profiling mechanism, such as a histogram, may be constructed with the data gathered to identify particular areas in the software or hardware where performance may be improved. Further, for those events being monitored that are time sensitive, e.g., a number of stalls, idles, etc., the count number data is collected over a known number of elapsed cycles so that the data has a context in terms of a sampling period. It should be appreciated that analysis of collected data may be facilitated using such tools as "aixtrace" or a graphical performance visualization tool "pv", each of which is available from IBM Corporation.

In FIG. 6a, an example representation of one configuration of MMCR0 suitable for controlling the operation of two PMC counters, e.g., PMC1 and PMC2, is illustrated. As shown in the example, MMCR0 is partitioned into a number of bit fields whose settings select events to be counted, enable performance monitor interrupts, specify the conditions under which counting is enabled, and set a threshold value (X).

The threshold value (X) is both variable and software selectable and its purpose is to allow characterization of certain data, such that by accumulating counts of accesses that exceed decreasing threshold values, designers gain a clearer picture of conflicts. The threshold value (X) is considered exceeded when a decrementer reaches zero before the data instruction completes. Conversely, the threshold value is not considered exceeded if the data instruction completes before the decrementer reaches zero; of course, depending on the data instruction being executed, "completed" has different meanings. For example, for a load instruction, "completed" indicates that the data associated with the instruction was received, while for a "store" instruction, "completed" indicates that the data was successfully written. A user readable counter, e.g., PMC1, suitably increments every time the threshold value is exceeded.

A user may determine the number of times the threshold value is exceeded prior to the signalling of performance monitor interrupt. For example, the user may set initial values for the counters to cause an interrupt on the 100th data miss that exceeds the specified threshold. With the appropriate values, the PM facility is readily suitable for use in identifying system performance problems.

Referring to FIG. 6a, as illustrated by this example, bits 0–4 and 18 of the MMCR0 determine the scenarios under which counting is enabled. By way of example, bit 0 is a freeze counting bit (FC). When at a high logic level (FC=1), the values in PMCn counters are not changed by hardware events, i.e., counting is frozen. When bit 0 is at a low logic level (FC=0), the values of the PMCn can be changed by chosen hardware events. Bits 1–4 indicate other specific conditions under which counting is frozen.

For example, bit 1 is a freeze counting while in a supervisor state (FCS) bit, bit 2 is a freeze counting while in a problem state (FCP) bit, bit 3 is a freeze counting while PM=1 (FCPM1) bit, and bit 4 is a freeze counting while PM=0 (FCPM0) bit. PM represents the performance monitor marked bit, bit 29, of a machine state register (MSR) (SPR 40, FIG. 1) . For bits 1 and 2, a supervisor or problem state is indicated by the logic level of the PR (privilege) bit of the MSR. The states for freezing counting with these bits are as follows: for bit 1, FCS=1 and PR=0; for bit 2, FCP=1 and PR=1; for bit 3, FCPM1=1 and PM=1; and for bit 4, FCPM0=1 and PM=0. The state for allowing counting with these bits are as for bit 1, FCS=1 and PR=1; for bit 2, FCP=1 and PR=0; for bit 3, FCPM1=1 and PM=0; and for bit 4, FCPM0=1 and PM=1.

Bits 5, 16, and 17 are utilized to control interrupt signals triggered by PMCn. Bits 6–9 are utilized to control the time or event-based transitions. The threshold value (X) is variably set by bits 10–15. Bit 18 control counting enablement for PMCn, n>1, such that when low, counting is enabled, but when high, counting is disabled until bit 0 of PMC1 is high or a performance monitoring exception is signaled. Bits 19–25 are used for event selection, i.e, selection of signals to be counted, for PMC1.

FIG. 6b illustrates a configuration of MMCR1 in accordance with an embodiment of the present invention. Bits 0–4 suitably control event selection for PMC3, while bits 5–9 control event selection for PMC4. Similarly, bits 10–14 control event selection for PMC5, bits 15–19 control event selection for PMC6, bits 20–24 control event selection for PMC7, and bits 25–28 control event selection for PMC8.

The counter selection fields, e.g., bits 19–25 and bits 26–31 of MMCR0 and bits 0–28 of MMCR1, preferably have as many bits necessary to specify the full domain of selectable events provided by a particular implementation.

At least one counter is required to capture data for performance analysis. More counters provide for faster and more accurate analysis. If the scenario is strictly repeatable, the same scenario may be executed with different items being selected. If the scenario is not strictly repeatable, then the same scenario may be run with the same item selected multiple times to collect statistical data. The time from the start of the scenario is assumed to be available via system time services so that intervals of time may be used to correlate the different samples and different events.

U.S. patent application Ser. No. 08/537,417, entitled "A Method and System for Performance Monitoring Time Lengths of Instruction Execution in a Processing System," filed Oct. 2, 1995, now abandoned, which is hereby incorporated by reference herein, further discusses selecting and distinguishing an event sequence using an effective address, performance monitoring through monitoring an order of processor events during execution, performance monitoring to identify bottlenecks and stalls, performance monitoring of the effect of memory accesses on a processor system, performance monitoring of dispatch unit deficiency, performance monitoring of idles, performance monitoring of misaligned memory accesses, performance monitoring of serialization instructions, performance monitoring of efficiency of branch unit operation, performance monitoring of time lengths of disabled interrupts, and performance monitoring of the time lengths of instruction execution. For further discussion of performance monitoring, please refer to Chapter 9, *Performance Monitor, PowerPC* 604 *RISC Microprocessor User's Manual*, pp. 9-1 through 9-11, IBM 1994, which is hereby incorporated by reference herein. In this reference, there are a couple of tables indicating code points for storage within the MMCRn registers, such as the registers illustrated in FIGS. 6a and 6b, which notify the various counters PMCn what events to monitor and in what fashion.

Referring next to FIG. 7, there is illustrated an embodiment for implementing the present invention. FIG. 7 illustrates performance monitor 50 having a couple of MMCRn registers 51 shown, SIAR and SDAR registers 40, PMC1 . . . PMCn (noted as Counters 1 . . . N) with their associated adders and counter control logic being fed by multiplexer 72 . . . 73 controlled by various bits of the MMCRn registers. Multiplexer 72 . . . 73 receive events from thresholder 71, time base circuitry 52 and from other events, which are signals originating from various execution units and other units within the microprocessor. All of these various circuit elements of performance monitor 50 are discussed herein and in the cross-referenced patent applications indicated above, and therefore further detailed discussion into the operation of these elements is not provided.

Figure 8:
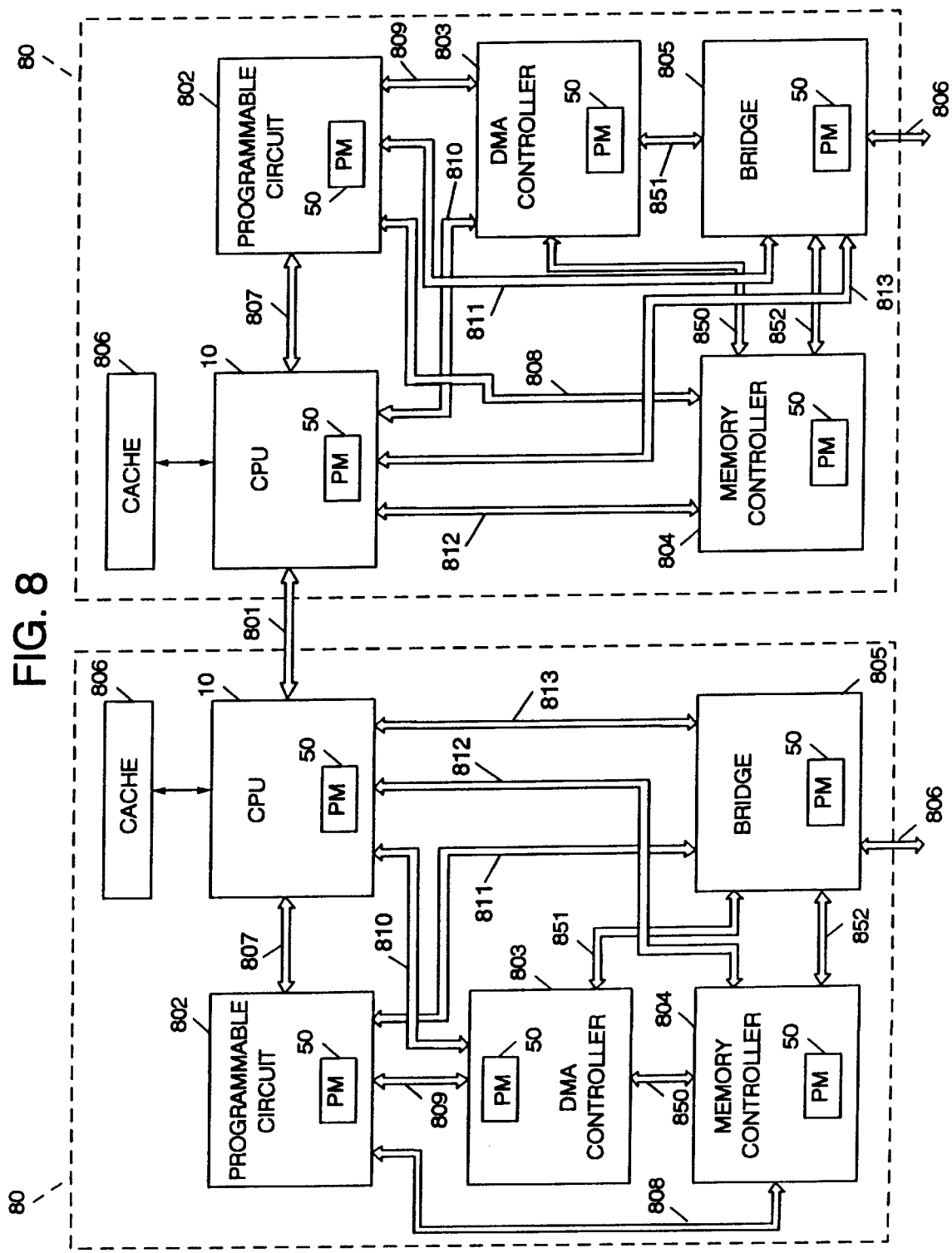
FIG. 8 illustrates an embodiment of the present invention.

Referring next to FIG. 8, there is illustrated a couple of embodiments of the present invention. Shown are data processing systems 80, which may be coupled by bus 801, or by some other well-known means. Systems 80 may be identical or may be varied in one way or another, which would be appreciated by one skilled in the art. Please note, however, that the present invention may be implemented in just one of systems 80; except where indicated, the following description will be with reference to only one of the shown systems 80.

CPU 10 may be similar to the processor illustrated in FIG. 1 having performance monitor 50 implemented therewith. CPU 10 may have an accompanying one or more caches 806. Furthermore, CPU 10 may be coupled to direct memory access (DMA) controller 803 via bus 810, memory controller 804 via bus 812, and bridge circuit 805 via bus 813. Bus 850 may carry signals between DMA controller 803 and memory controller 804. Bus 851 may carry signals between DMA controller 803 and bridge circuit 850. And, bus 852 may carry signals between memory controller 804 and bridge circuit 805.

One or more of DMA controller 803, memory controller 804, and bridge circuit 805 may include a performance monitor 50. Note, however, that performance monitor 50 within each of these devices may be different than what is specifically implemented within CPU 10 or within one of the other devices. Performance monitors 50 may be implemented in a similar manner as illustrated in FIG. 7.

System 80 may also include a programmable circuit 802, which also includes performance monitoring capabilities 50. Programmable circuit 802 is coupled to CPU 10 by bus 807. Programmable circuit 802 is coupled to DMA controller 803 via bus 809, memory controller 804 via bus 808, and bridge circuit 805 via bus 811. Programmable circuit 802 may be utilized in conjunction with or instead of CPU 10 in order to perform some type of performance monitoring analyses using performance monitor 50 enclosed within programmable circuit 802. For example, programmable circuit 802 could be used to monitor signals passed over buses 850–852. Therefore, the following discussion will apply to implementing a performance monitoring capability within CPU 10 or within programmable circuit 802, or both in some type of combination.

DMA controller 803, memory controller 804, and bridge circuit 805 are shown as examples of other modules within a data processing system that may implement performance monitor 50 so that a performance analysis may be made of the interaction of one or more of these devices alone, with each other, or with CPU 10. Naturally, one skilled in the art would appreciate that other modules not shown here may also implement performance monitor 50 in a similar manner.

An advantage of the present invention is that the performance monitoring capability discussed in the co-pending applications may be expanded on a system-wide basis so that performance analyses may be made of operations within the entire system 80 (or systems 80, by transferring performance monitoring signals across bus 801) and not just within CPU 10. The remainder of the discussion explains how such performance monitoring capabilities may be implemented within system 80, or systems 80. A discussion of all of the various analyses that may be performed using the present invention is not provided in detail herein. It is sufficient to note that just about any type of analysis that would take advantage of the fact that there are performance monitors within a plurality of devices within systems 80 could be implemented with the present invention.

The present invention provides for the transfer of signals via buses 808–813 coupled to one or more pins on each of the devices in system 80, wherein the signals control counting and can be used to inform CPU 10 or programmable circuit 802 that a device has a counter that has or is about to overflow.

Figure 10:
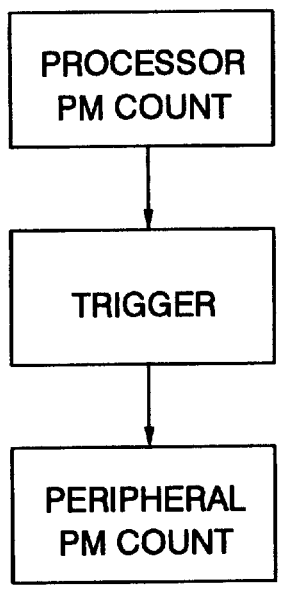
FIGS. 10, 11 and 12 illustrate processes for communicating between performance monitors of devices in a data processing system.

The first signal may be an output from CPU 10. The signal is output high when performance monitor 50 is counting, and the signal is output low when performance monitor 50 is not counting. In systems where there are more than one processor 10, these signals may be ORed together so that if any processor is counting, the signal is high. Only if all the processors are not counting is such a signal sent low. Implementation of the first signal is further illustrated with the flow diagram in FIG. 10 wherein the trigger signal is sent from the processor performance monitor 50 to the peripheral device performance monitor. This first signal, Signal 1, is described in more detail below.

Figure 12:
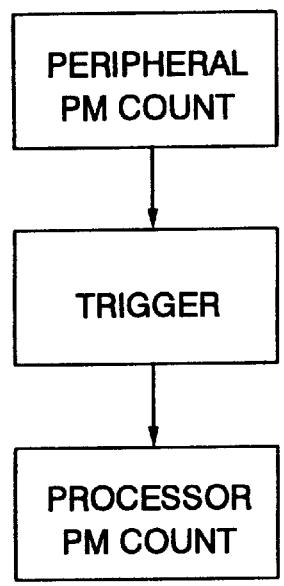

The second signal may be an input to processor 10 (or programmable circuit 802). This signal may also act as a trigger to inform processor 10 that a counter within a peripheral device is now counting. This second signal, Signal 2, is described in more detail below, and is further illustrated in FIG. 12.

The third signal may be an input to processor 10 (or programmable circuit 802). The signal is output from the external devices and is set high to indicate that some type of attention to the device is required, such as a counter going negative or wrapping. This attention may be translated to requiring a performance monitor interrupt, where the software determines the appropriate actions to take. The signal from the external devices may be ORed together so that the signal is high if any device needs attention and the signal is low only if none of the devices need attention. In systems where there are more than one processor, a reasonable implementation is to route the input to a single processor, which has the responsibility of determining the device that needs attention and processing the interrupt. The foregoing third signal is further illustrated by the flow diagram in FIG. 11 where an interrupt signal may be sent from one of the peripheral performance monitors 50 to the processor performance monitor. This third signal, Signal 3, is described in more detail below.

The input signal to processor 10 or programmable circuit 802 may be implemented via any signal/pin, where the signal is a countable event. Performance monitor 50 can be programmed to signal an interrupt as soon as a single occurrence of the signal is detected.

Figure 9:
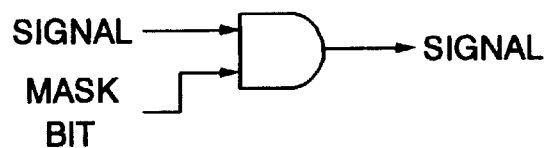
FIG. 9 illustrates an alternative embodiment of the present invention.
Figure 11:
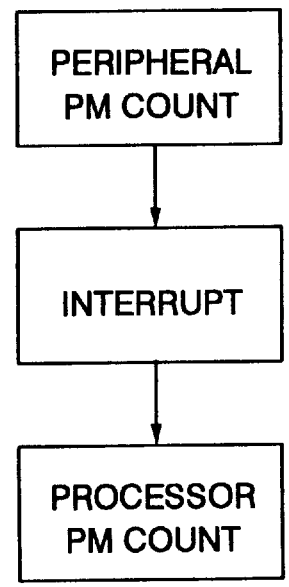

Referring next to FIG. 9, a further alternative embodiment of the present invention is that the signals transferred to and from processor 10 (or programmable circuit 802) may be maskable whereby the signal is only utilized if a mask bit has been asserted. For example, whether or not an interrupt signal received from a peripheral device to processor 10 is processed, in accordance with the implementation shown in FIG. 11, is situation dependent. As an example, the receiving processor 10 may not want to take an interrupt so that it will not disturb its current counting or instruction flow. As a result, mask bits may be used to adjust and define certain procedures so that they are dependent upon only selected situations occurring within selected devices.

Each off-processor device might have its own way of controlling counting within its performance monitor. It might also have its own control registers, such as registers MMCRn, which would select events to count (see FIG. 7). A power-on reset condition might be used to cause all external devices to select the disabled condition and software would be used to initiate counting.

As discussed previously, the basic architecture for the PowerPC processor performance monitor support (see FIG. 7) has a variable number of control registers, MMCR0, MMCR1, . . . MMCRj. Similarly, the architecture for the PowerPC processor performance monitor support has a variable number of counters, PMC1, PMC2, PMC3, . . .

PMCn. The MMCRj have control flags and selection fields. The processor implementation of the MMCRj and PMCn are via Special Purpose Registers, SPRs.

As discussed above, this same approach can be supported via non-processor system components, such as, bridge chips 805, memory controllers 804, and cache controllers. Instead of using SPRs, however, specific address locations can be used to provide the same support.

The system components (802–805) could support the same basic control and access bits and 32-bit word definitions for the control registers MMCRjs and counters PMCns as processor 10. They would use the bits that are applicable for their particular implementation. Using such similar architecture for all performance monitors within system 80 or systems 80 reduces the amount of and time for programming all of the various registers for programming the performance monitors by a user. This may become especially valuable with a massive parallel machine having many systems 80, or at least many processors 10.

As a result, programming of all of the performance monitors 50 can be accomplished by programming similar bit fields or similarly ordered addresses.

For example, the MMCR0 FC bit could be implemented for all system components (802–805) that supported performance instrumentation.

Off-processor system components (802–805) could support MMCR0 Bits 5 and 6:

| | |
|---|---|
| Bit 5 | Performance Monitor Exception Enable (PMXE) |
| bit=0 | Performance Monitor exceptions are disabled. |
| bit=1 | Performance Monitor exceptions are enabled until a Performance Monitor exception occurs, at which time: MMCR0[PMXE] is set to 0. |

An exception would typically be signalled from the system component (802–805) to processor 10 via a signal or pin.

Software can set this bit to 0 to prevent Performance Monitor interrupts.

Software can set this bit to 1 and then poll the bit to determine whether an enabled condition or event has occurred. This is especially useful on an implementation that does not provide the Performance Monitor interrupt.

| | |
|---|---|
| Bit 6 | Freeze Counters on Enabled Condition or Event (FCECE) |
| bit=0 | The PMCs are incremented (if permitted by other MMCR bits). |
| bit=1 | The PMCs are incremented (if permitted by other MMCR bits) until an enabled condition or event occurs when MMCR0[TRIGGER]=0, at which time MMCR0[FC] is set to 1. |

If the enabled condition or event occurs when MMCR0 [TRIGGER]=1, the FCECE bit is treated as if it were 0.

Alternatively, system component (i.e., the off-processor devices 802–805) support for the control registers and the counters could be through system specific address locations in T=0 I/O space, i.e., addressable memory locations in cache inhibited I/O space. It is recommended that some specific addresses be chosen for different types and versions of system components. It is also recommended that a configuration mechanism be developed that allows the displacement of the registers to be changed. Because the Performance Monitoring (PM) Application Programming Interface (API) converts generic requests into packed arrays of control registers and counters, the suggested approach is to have the locations of the MMCRns and the PMCns be ordered and in continuous memory space. The MMCRns and the counters are defined to be 32-bit words so it would be reasonable to pack these into the address space as 32-bit words. It is also reasonable to have a support for displacements that reflect 64-bit words. This type of support could be part of the table support definition of the PM API. With this implementation, the reads and writes to the control registers and counters would be at displacements from an address that is pair of the component specific table.

As noted above, this disclosure defines a methodology that facilitates "add-on" features, which provides for real time control and capture of information related to signal analysis and allows for a better analysis of system performance. The primary advantage of having an "add-on feature" that can be added on to any individual system is that the cost is not on all systems sold. Specifically, signals that are available on a bus or outside of any of the components can be captured by the "add-on" feature and not necessarily incorporated into the component itself.

The form of the "add-on" feature can be tailored to the needs of the system. For a low end system, a very simple Programmable Logic Device (PLD) or Application Specific Integrated Circuit (ASIC) can be appropriate (i.e., via programmable circuit 802). For a high end system, a full custom chip may be appropriate. For the remainder of this disclosure, "PLD" will be used to indicate device 802 that allows for programmable logic, which can be added onto system 80. This PLD 802 provides for real time control and capture of information related to signal analysis and can be used for analysis of system performance.

The approach is to design a PLD 802 which can be tailored to the system specific requirements for monitoring. The PLD 802 can be designed to recognize and count selected bus signals. A simple design can mirror the PM 50 design of processor 10. The selection of the signals to count can be supported as if it were another system component using the related disclosed approach of writing to and reading from specific address locations in T=0 I/O space, as discussed previously.

The PLD 802, itself, can be designed to work in a manner similar to the processor's performance monitor facility 50.

In one embodiment, the present invention may provide for signals (pins) which control counting and which can be used to tell the processor 10 that a device needs some attention, for example, its counters have gone negative or have wrapped.

The proposal has a processor part and a "system component" part. For the processor part, there would be two more control bits, defined in another control address space MMCR2. (The Operating System access would be via separate SPR numbers from MMCR0 and MMCR1, but the actual implementation may use the same physical register space as two unused bits in one of the existing MMCRns.) In addition to the two bits, there are three new signals (pins). Signal Support:

Signal 1: Output from the processor 10 (see FIG. 10)
This signal is asserted (polarity independent) when counting starts. If the TRIGGER bit is set, this signal is not asserted until a trigger condition occurs (PMC1 negative or an enabled exception occurs.)

Signal 2: Input to the processor 10 (the non-processor system components (e.g., 802, 803, 804, 805)) control this signal (see FIG. 12).
Any of the components can set this high to tell the processor 10 that they are now counting. One of the new MMCR2 bits allows monitoring to start, when this signal goes high. See MMCR2(a) below.

Signal 3: Input to the processor 10 (the non-processor system components) control this signal (see FIG. 11). Any of the components can set this high to tell the processor 10 that they want the process to take a PM interrupt. The processor 10 only checks this signal if MMCR2(b), see below, is set.

Note that this signal is a pulse (not sticky). The peripherals (802–805) are telling the processor 10 that they want to take a PM interrupt. This would typically occur when they have a counter that has become negative. An in-line device, such as, an L2/L3 cache controller will act as an intermediary between the signals sent to/from a bridge chip 805 and the processor 10. This is necessary because the bus speeds will probably be different.

| New MMCR2 bits: |
| --- |
| Bit a: Freeze Counters Until Input Signal 2 (FCISIG) |
| Bit a=0 The PMCs are incremented (if permitted by other MMCR bits). |
| Bit a=1 The PMCs are not incremented until the input signal (Signal 2 for processors) goes high. When the Signal 2 goes high: the PMCs resume incrementing (if permitted by other MMCR bits) MMCR1 [FCISIG] is set to 0 |
| Bit b: PM Condition check for Monitoring Signal 3 (PMCSIG3) This bit controls whether signal 3 high condition due to a high Signal 3 are enabled. |
| Bit b=0 Signal 3 high conditions are disabled |
| Bit b=1 Signal 3 high conditions are enabled |

A signal 3 high condition is added to the list of conditions that can cause PM exceptions.

For a non-processor system component (802–805), the PMXE support translates to whether the component sets Signal 3 high. For the new MMCR2 bits defined, bit a is interpreted to look at its input signal which is output from the processor 10, so it would be defined as:

| |
| --- |
| Bit a: Freeze Counters Until Input Signal 1 (FCISIG) |
| Bit a=0 The PCMs are incremented (if permitted by other MMCR bits). |
| Bit a=1 The PMCs are not incremented until the input signal, Signal 1 for system components, goes high. When the Signal 1 goes high: the PMCs resume incrementing (if permitted by other MMCR bits) |
| Bit b: PM Condition check for Monitoring Signal 3 (PMCSIG3) This bit controls whether signal 3 high condition due to a high Signal 3 are enabled. |
| Bit b=0 Signal 3 high conditions are disabled |
| Bit b=1 Signal 3 high conditions are enabled |

Note that Signal 3 may be monitored by all the System 80 components and all counters frozen until the exception condition is processed.

This architecture allows any device to signal a start counting condition or a stop counting condition from any other device. For example, an in-line L2 controller may take its input from all devices. This is basically a topology independent architecture.

An expected usage for Signal 1 is to gate counting. By appropriately programming the processor and system components, there is a wide range of control over counting. For example, one can prevent counting from occurring on selected devices when the primary processor is executing the wait process—a specific application of the usage of the MSR(PMM) bit. This same type of gating can occur with other capabilities, such as, only starting to count when execution is occurring at a specific instruction address.

The expected usage for Signal 2 is to have the counting from one component initiate counting on another component without requiring an intervening interrupt.

An expected usage for Signal 3 is to isolate performance monitoring on a given event which is occurring on a specific system component. For example, it may be desirable to interrupt and isolate on certain performance events, such as I/O Bridge AStat Retries, L2 controller received a snoop request, or a memory controller issued a retry due to a busy condition. The interrupt handler could then gather more information on the event with the intent of providing more information related to the event or preventing the future occurrence of the event.

This scheme allows for one processor to start counting after another processor reaches a certain state, such as, an access to a semaphore. This type of triggering could be used to have all processors start monitoring after the monitored condition is detected.

Although the present invention and its advantages have been described in detail, it should be understood that various changes, substitutions and alterations can be made herein without departing from the spirit and scope of the invention as defined by the appended claims.

What is claimed is:

1. A data processing system comprising:
    a first processor, wherein the first processor includes a first performance monitor;
    a first device coupled to the first processor, wherein the first device includes a second performance monitor; and
    circuitry for communicating between the first and second performance monitors,
    wherein the first and second performance monitors are each programmable for receiving and counting selected signals within the processor and device, wherein the first performance monitor is operable for triggering operation of the second performance monitor.

2. The data processing system as recited in claim 1, wherein the first and second performance monitors are each programmable using bit fields in software-accessible registers.

3. The data processing system as recited in claim 2, wherein the first and second performance monitors can be programmed to perform a similar function by programming similar bit fields in corresponding registers.

4. The data processing system as recited in claim 2, wherein the first and second performance monitors can be programmed to perform a similar function by programming similarly ordered address data.

5. The data processing system as recited in claim 1, wherein the second performance monitor is operable for sending results of the operation to the first performance monitor.

6. The data processing system as recited in claim 1, further comprising:
    a second processor coupled to the first processor, wherein the second processor includes a third performance monitor;
    a second device coupled to the second processor, wherein the second device includes a fourth performance monitor; and
    circuitry for communicating between the third and fourth performance monitors.

7. The data processing system as recited in claim 1, further comprising:
    a programmable circuit including a third performance monitor coupled to the first and second performance monitors.

8. The data processing system as recited in claim 1, further comprising circuitry for masking the triggering of the operation of the second performance monitor.

9. A data processing system comprising:
- a first processor, wherein the first processor includes a first performance monitor;
- a first device coupled to the first processor, wherein the first device includes a second performance monitor; and
- circuitry for communicating between the first and second performance monitors,
- wherein the first and second performance monitors are each programmable for receiving and counting selected signals within the processor and device, wherein the second performance monitor is operable for sending an interrupt to the processor.

10. The data processing system as recited in claim 9, further comprising circuitry for masking the receiving of the interrupt from the second performance monitor.

11. A data processing system comprising:
- a first processor, wherein the first processor includes a first performance monitor;
- a first device coupled to the first processor, wherein the first device includes a second performance monitor; and
- circuitry for communicating between the first and second performance monitors,
- wherein the first and second performance monitors are each programmable for receiving and counting selected signals within the processor and device, wherein the second performance monitor is operable for triggering an operation of the first performance monitor.

12. In a data processing system, wherein the data processing system includes (1) a first processor, wherein the first processor includes a first performance monitor, and (2) a first device coupled to the first processor, wherein the first device includes a second performance monitor, wherein the first and second performance monitors are each programmable for receiving and counting selected signals within the processor and device, a method for performing performance monitoring of selected operations, comprising the steps of:
- programming the first and second performance monitors via software-accessible registers;
- performing, by the first and second performance monitors, one or more counting functions; and
- communicating results of the one or more counting functions between the first and second performance monitors, wherein the communicating step further includes the step of triggering, by the first performance monitor, operation of the second performance monitor.

13. The method as recited in claim 12, wherein the programming step further includes the step of programming similar bit fields in corresponding registers of the first and second performance monitors.

14. The method as recited in claim 12, wherein the communicating step further includes the step of sending, by the second performance monitor, results of the operation to the first performance monitor.

15. A data processing system comprising:
- a first processor, wherein the first processor includes a first performance monitor;
- a second processor coupled to the first processor, wherein the second processor includes a second performance monitor; and
- circuitry for communicating between the first and second performance monitors,
- wherein the first and second performance monitors are each programmable for receiving and counting selected signals within the first and second processors, respectfully, wherein the first performance monitor is operable for triggering operation of the second performance monitor.

16. The data processing system as recited in claim 15, wherein the first and second performance monitors are each programmable using bit fields in software-accessible registers.

17. The data processing system as recited in claim 16, wherein the first and second performance monitors can be programmed to perform a similar function by programming similar bit fields in corresponding registers.

18. The data processing system as recited in claim 15, wherein the second performance monitor is operable for sending results of the operation to the first performance monitor.

19. A data processing system comprising:
- a first processor, wherein the first processor includes a first performance monitor;
- a second processor coupled to the first processor, wherein the second processor includes a second performance monitor; and
- circuitry for communicating between the first and second performance monitors,
- wherein the first and second performance monitors are each programmable for receiving and counting selected signals within the first and second processors, respectfully, wherein the second performance monitor is operable for sending an interrupt to the first processor.

* * * * *